United States Patent

[11] 3,612,913

[72] Inventor Rikio Maruta
Tokyo, Japan
[21] Appl. No. 799,745
[22] Filed Feb. 17, 1969
[45] Patented Oct. 12, 1971
[73] Assignee Nippon Electric Company, Limited
Tokyo, Japan
[32] Priority Feb. 17, 1968
[33] Japan
[31] 43/9889

[54] DIGITAL CIRCUIT
5 Claims, 11 Drawing Figs.

[52] U.S. Cl. ..... 307/290,
307/235, 307/247, 328/146, 330/30 D
[51] Int. Cl. ..... H03k 3/295
[50] Field of Search ..... 307/235,
290, 247; 328/146; 330/30, 69, 30 D

[56] References Cited

UNITED STATES PATENTS

| | | | |
|---|---|---|---|
| 2,783,453 | 2/1957 | Rose | 328/146 X |
| 3,054,910 | 9/1962 | Bothwell | 307/235 |
| 3,074,020 | 1/1963 | Ropiequet | 307/235 X |
| 3,315,089 | 4/1967 | Mayne | 330/30 X |
| 3,321,639 | 5/1967 | Fowler et al. | 307/235 X |
| 3,364,434 | 1/1968 | Widlar | 330/30 X |

*Primary Examiner*—Donald D. Forrer
*Assistant Examiner*—R. C. Woodbridge
*Attorney*—Sandoe, Hopgood and Calimafde

ABSTRACT: A digital circuit is described for operation with transistors in the unsaturated state. A first pair of transistors are connected in differential relationship and provided with a single resistive positive feedback circuit. A second pair of transistors also connected in differential relationship have their collectors respectively coupled to the bases of the first pair of transistors. A source of clock pulses is coupled to the common emitters of the second pair to render the transistors in the first and second pair selectively conductive in correspondence with signals applied to the input bases of the second pair of transistors. Several embodiments and applications are described.

INVENTOR.
RIKIO MARUTA by
Sandoe, Hopgood & Calimafde
ATTORNEYS

INVENTOR.
RIKIO MARUTA by
Sandoe, Hopgood & Calimafde
ATTORNEYS

INVENTOR.
RIKIO MARUTA
by
Sandoe, Hopgood & Calimafde
ATTORNEYS

INVENTOR.
RIKIO MARUTA
by
Sandoe, Hopgood & Calimafde
ATTORNEYS

DIGITAL CIRCUIT

The present invention relates to a digital circuit and, more particularly, to a high-speed digital circuit which may be utilized in high-speed communication systems, electronic digital computers and other electronic digital equipment.

In recent years, considerable efforts have been devoted to develop communications of higher quality and larger capacity in order to meet the ever growing requirements for communications. To this end, the realization of high-speed digital circuits has long been desired in the field of digital communications such as a pulse code modulation (PCM) communication system. Logical digital circuits employed in these systems conventionally use conducting transistors in the saturated state. At present, however, this type of logical circuit cannot successfully operate at clock pulse rates as high as hundreds of mega-bits per second. Although improvements expected in transistors will expand the upper operating speed of the saturated transistor logic circuit, it is unlikely that this type of logic circuit will utilize the high-speed capability of transistors.

A so-called current-switching circuit which employs transistors in the nonsaturated condition is well known as a circuit technique which makes use of the high-speed capability of transistors. When digital systems are constructed of current-switching circuits, it is usual that each current-switching circuit constitutes a NAND or NOR logical element to obtain various logical functions by repeated use of the elements, A number of current-switching circuits, however, must be combined in a complicated manner to realize functional circuits such as counters. The time-delay accumulated through this complicated combination markedly decreases the operating speed compared with the speed of a single current-switching circuit. The operating speed is further reduced by the number of fanouts which increase due to the required complicated circuit combination.

One method of avoiding such reduction is speed is to construct a logic circuit from a single component such as a tunnel diode and a current-switching circuit. The tunnel diode provides the desired high speed and the current-switching circuit increases the output level. However, the combination tends to result in a complicated circuit. It is true that higher-speed circuits are expected to be built by employing tunnel diodes alone, but many undesirable factors such as adjustment difficulties, variation in characteristics and stability leave much to be improved before any tunnel diode circuit of practical use is obtained. Even if the combination of tunnel diode and current-switching circuits are employed, there still are many unsolved problems peculiar to the tunnel diode, such as the voltage margin of the power source, stability as a function of noise, and design restrictions.

The present invention provides a digital circuit employing transistors as active elements, and yet provides a fundamental high-speed digital circuit capable of performing a number of functions without the various disadvantages stated above.

An object of this invention, therefore, is to provide a digital circuit which is operable at high speed and is stable in operation.

Another object of this invention is to provide a fundamental circuit which can be utilized for various applications.

A further object of this invention is to provide a digital circuit which is economical and is readily converted to an integrated circuit.

This invention will be more fully understood from the following detailed description in conjunction with the accompanying drawings, wherein.

Briefly stated, the invention contemplates first and second pairs of differentially coupled transistors with the emitters of each pair in common connection. A single resistive positive feedback circuit is employed with the first pair to impart thereto a signal storage function. The second pair of transistors drives the first pair into the desired states of conduction in response to a source of clock pulses coupled to the emitters of the second pair and depending upon signals applied to the bases of the second pair of transistors.

Before the description of the circuit of this invention as a whole is described, a circuit portion constituting a part of it will be first described.

Figure 1:
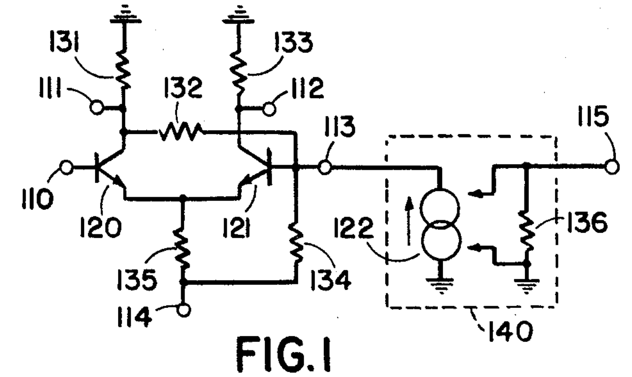
FIG. 1 is a schematic diagram of a portion of the circuit of this invention.
Figure 2:
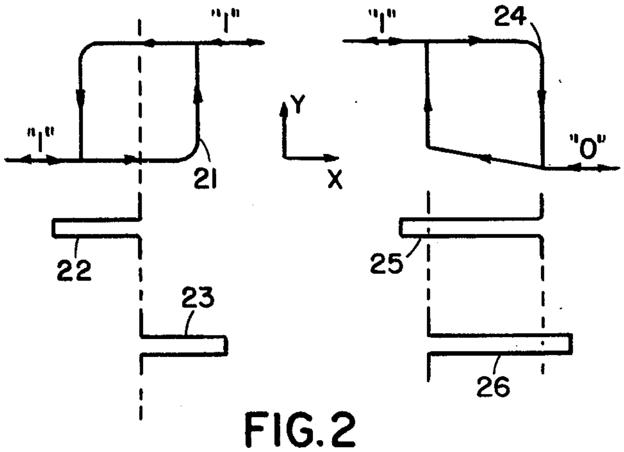
FIG. 2 is a waveform diagram to show the principle of operation of the circuit of FIG. 1.

Referring to FIG. 1, there is shown a circuit performing a storage function. The circuit includes a current-switching circuit and a feedback circuit, the former comprising transistors 120 and 121 as well as resistors 131, 133 and 135, the latter comprising resistors 132 and 134. This feedback circuit also performs the function of DC level shifting by means of the resistors 132 and 134. The circuit is subjected to positive feedback since the feedback path is connected from the collector of one of the transistors to the base of the other. When the input voltage is applied to a terminal 110, the output voltage appears at a terminal 112. The input-output characteristic in response to the varying input voltage is illustrated by the curve 21 of FIG. 2, in which the X-axis represents the input voltage and the Y-axis represents the output voltage. Since the input-output characteristic presents a hysteresis characteristic as shown, it will be apparent that this circuit performs a storage function. If a trigger pulse of a polarity such as 22 of FIG. 2, rising from a certain level as shown by the dotted line in FIG. 2 within the hysteresis region, is applied to the input terminal 110, the circuit will assume one of the binary states, say "o," while if a trigger pulse of the opposite polarity such as 23 of FIG. 2 is applied, the circuit will be switched to the opposite state, say "1." It should be particularly noted at this point that the value of the hysteresis voltage is stable as it is a function of the feedback voltage applied to the base of the transistor 121, and that it can be easily regulated through circuit designing. Any other type of feedback circuit is expected to be equally effective as long as it can pass direct current. For example, a Zener diode may be employed.

The circuit shown in FIG. 1, whose storage function can be understood from the above description, needs trigger pulses of opposite polarities for setting and resetting. It is possible, however, to set as well as to reset this circuit by trigger pulses of only one polarity, the method of which will now be described. Let the voltage at the terminal 110 be fixed and the input voltage be applied to a terminal 113. In order to prevent the feedback circuit from being interfered with, and to observe the input-output characteristics correctly, the circuit is current driven from a high-impedance source through a voltage-to-current transducer 140. A current source 122 supplies current proportional to the voltage applied at a terminal 115 across a resistor 136, with the proportional coefficient being appropriately chosen. As a result, the drive impedance can be transformed without any side effects. Under these conditions the input-output characteristic observed between the varying input voltage at the terminal 115 and the corresponding output voltage at the terminal 112 exhibits a hysteresis characteristic such as the curve 24. If the high output voltage corresponds, as in the above-described case, to the binary "1," this circuit becomes "1," when the input voltage decreases and is switched to "0" when the input voltage increases, just contrary to the former case. The circuit of FIG. 1 thus also operates as a storage circuit when driven from the terminal 113. A trigger pulse such as 25 of FIG. 2 must be applied to the terminal 113 in order to switch from " 0" to "1," while a trigger pulse such as 26 of FIG. 2 is required in order to switch from "1" to "0." In fact, however, pulses of the waveform such as 25 or 26 on FIG. 2 are not observed at the terminal 113, because of the effect of the feedback path to the terminal 113 via the resistor 132. Consequently, a composite waveform appears at terminal 113.

From the above description, it can be understood that the storage circuit of FIG. 1 can be set and reset by trigger pulses of the same polarity such as 22 and 25 or 23 and 26 of FIG. 2 being applied at both of the terminals 110 and 113. This principle is applied to the fundamental circuit of the present invention described below.

Figure 3:
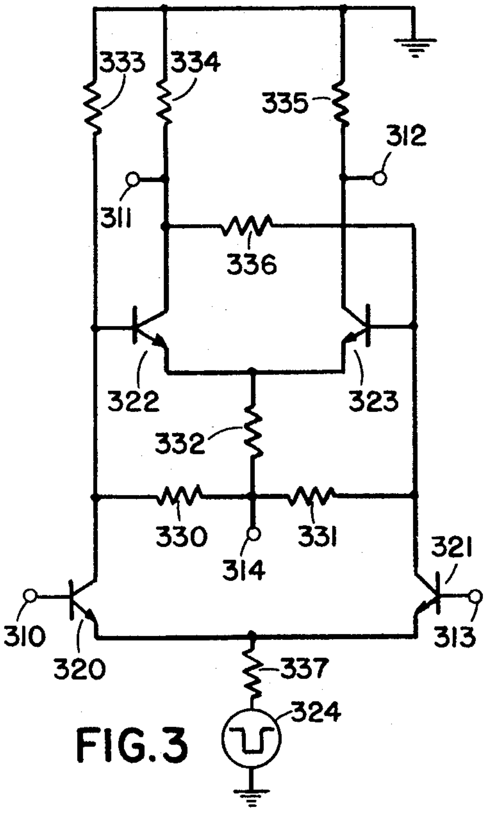
FIG. 3 is a schematic diagram of a fundamental circuit embodying the present invention.

FIG. 3 illustrates a fundamental circuit embodying the present invention. The circuit portion consisting of transistors 322 and 323 and resistors 331, 332, 334, 335, and 336 is the same storage circuit as has been illustrated in FIG. 1. Terminal 314 is a power supply terminal which is connected to a negative voltage supply in this case. Terminal 312 is an output terminal and another terminal 311 is a complementary output terminal which means complementary to the output at the terminal 312. In order to supply a bias voltage to the base of the transistor 322, the power supply terminal 314 is connected via a resistor 330 to the base of the transistor 322, which in turn is connected via a resistor 333 to ground. The base of the transistor 322 is also connected to the collector of a transistor 320, and the base of the transistor 323 is connected to the collector of a transistor 321. The emitters of the transistors 320 and 321 are connected together, the junction point of which is supplied with current pulses from a voltage pulse source 324 through a resistor 337. Thus the transistors 320, 321 and the resistor 337 together constitute another current-switching circuit. This circuit, however, is different from the conventional current-switching circuit in that pulse current instead of direct current flows through the emitters.

Figure 4:
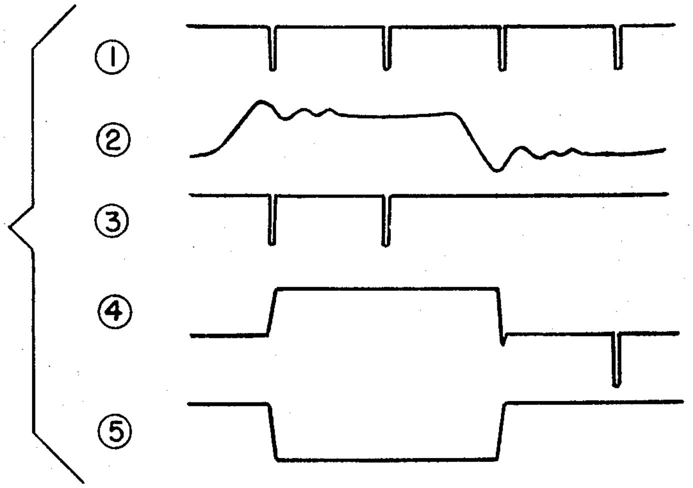
FIG. 4 is a waveform diagram to illustrate the operation of the circuit of FIG. 3.

Let us now examine the operation of this circuit in response to the input signal shown in FIG. 4–2 applied to the terminal 310 which is connected to the base of the transistor 320, when the current pulses shown in FIG. 4–1, which are sometimes called clock pulses, are applied to the junction point of the emitters of the transistors 320 and 321, with a reference voltage being applied to the terminal 313 connected to the base of the transistor 321. If the reference voltage is properly selected, the binary state (1,0) of the input signal determines the transistor 320 or 321 through which the current pulse at the junction point will flow. If the input voltage is higher than the reference voltage, the current pulse will flow through the transistor 320, but not through the transistor 321, and vice versa. When the transistor 320 is in the conductive state, trigger pulses such as shown in FIG. 4,3 appear at the base of the transistor 322, causing the storage circuit portion to switch as described above. On the contrary, when the transistor 321 is rendered conductive, the current pulse flows to the base of the transistor 323, causing the storage circuit portion to switch to the opposite state. The voltage applied to the base of the transistor 323 assumes the waveform as shown in FIG. 4,4 which is a composite waveform of the trigger pulse and the feedback voltage. At the output terminal 312, as a result, there appears an output which is of the polarity opposite to the input, timed with the clock pulses, and is shaped as shown in FIG. 4,5. Although an output of the same polarity as the input is available at the terminal 311, it cannot feed power to a heavy load since the feedback circuit itself acts as a part of load to it. If the input voltage is applied to the terminal 313 with the reference voltage being applied to the terminal 310, an output of the same polarity as the input can be obtained at the terminal 312.

Figure 5:
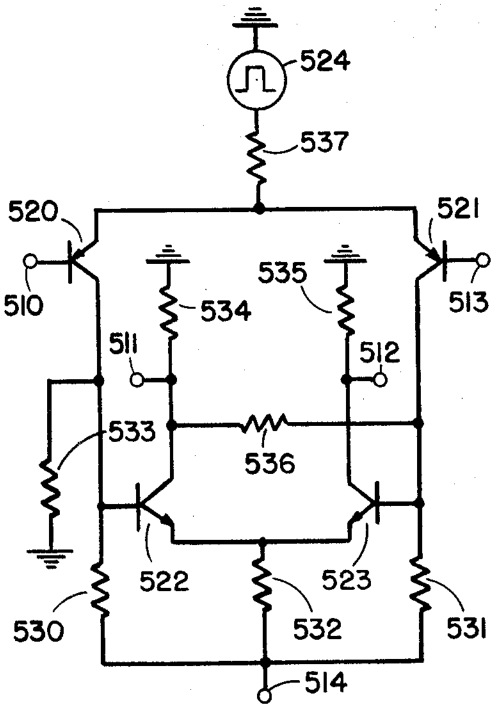
FIG. 5 is a schematic diagram of another fundamental circuit embodying the present invention.
Figure 6:
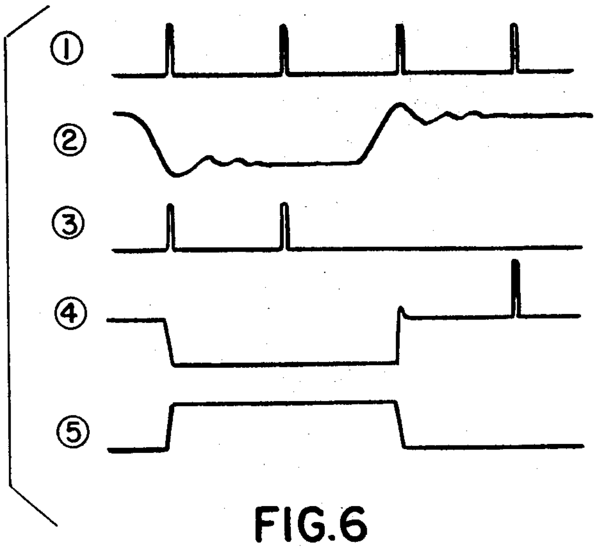
FIG. 6 is a waveform diagram of waveforms illustrating the operation of the circuit shown in FIG. 5.

Referring to FIG. 5, which shows a modified fundamental circuit in accordance with this invention, its construction and operation will be described. The circuit portion comprising transistors 522 and 523 as well as resistors 531 through 536 is the same storage circuit portion as that of the circuit of FIG. 3. The other circuit portion comprising transistors 520, 521, resistors 537 and a voltage pulse source 524, however, is different from the circuit of FIG. 3 in that the transistors are of PNP type and that the pulse source is of the opposite polarity. It will be easily understood that the circuit of FIG. 5 operates like that of FIG. 3. Assume that a reference voltage is applied to the terminal 513, which is connected to the base of the transistor 521, and an input signal is applied to the terminal 510, which is connected to the base of the transistor 520. Positive current pulses shown in FIG. 6–1, of opposite polarity to the case of the circuit of FIG. 3, are supplied to the junction point of the emitters of the transistors 520 and 521, and an input signal having a waveform such as shown in FIG. 6–2 is applied to the input terminal 510. If the input voltage is lower than the reference voltage, the transistor 520 will conduct and the transistor 521 will be cut off. The current pulses then supply the base of the transistor 522 with trigger pulses whose waveform is shown in FIG. 6–3. If, on the other hand, the input voltage is higher than the reference voltage, the transistor 521 will be rendered conductive, causing the trigger pulses to be applied to the base of the transistor 523. FIG. 6–4 illustrates the waveform of the signal applied to the base of the transistor 523. It can thus be understood that the circuit of FIG. 5 generates at the terminal 512, in response to the input such as shown in FIG. 6–2, an output which is timed with the clock pulses and is shaped as shown in FIG. 6,5. Like the circuit of FIG. 3, the terminal 511 is a complementary output terminal and the terminal 514 is a power supply terminal. If the input is applied to the terminal 513, the output of the same polarity as the input will be available just as in the circuit of FIG. 3.

Comparing the fundamental circuit of FIG. 5 with that of FIG. 3, there can be noticed some difference in the relation between the DC levels of input and output. That is, in the circuit shown in FIG. 3, the output DC level necessarily exceeds the input DC level, and as a result, DC level shifters are necessary where identical circuits are to be connected in cascade or an output is to be connected back to its own input terminal. In the circuit of FIG. 5, as contrasted, the combination of PNP and NPN transistors makes it possible to keep the output DC level equal to that of the input. Accordingly, no level shifter is needed and one circuit can be directly connected to another where the circuits of FIG. 5 are employed. When transistors of NPN type and PNP type are combined to constitute a circuit, it is usually required that both types of transistors have similar characteristics. But the circuit of FIG. 5 does not impose such characteristic similarities. Further, the transistors 520 and 521 are operated with smaller current as well as lower power, and a lower $f_T$ (gain bandwidth product) will suffice in comparison with the similar characteristics of transistors 522 and 523. The circuit of FIG. 5 may be easier to use because it needs no DC level shifters, while the circuit of FIG. 3 may be more readily converted to an integrated circuit as it includes only one type of transistors. It is important and should be particularly noted, however, that the circuits of both FIG. 3 and FIG. 5 are quite suitable for integrated circuits since they only consist of transistors and resistors and neither include inductive nor capacitive elements. It will be apparent that the circuit of either FIG. 3 or FIG. 5 can be utilized as a pulse regenerator or a return to zero (RZ) to nonreturn to zero (NRZ) converter. Moreover, the circuit of either FIG. 3 or FIG. 5 can constitute with additional circuits many other useful circuits, as will be described.

Figures 7, 8:
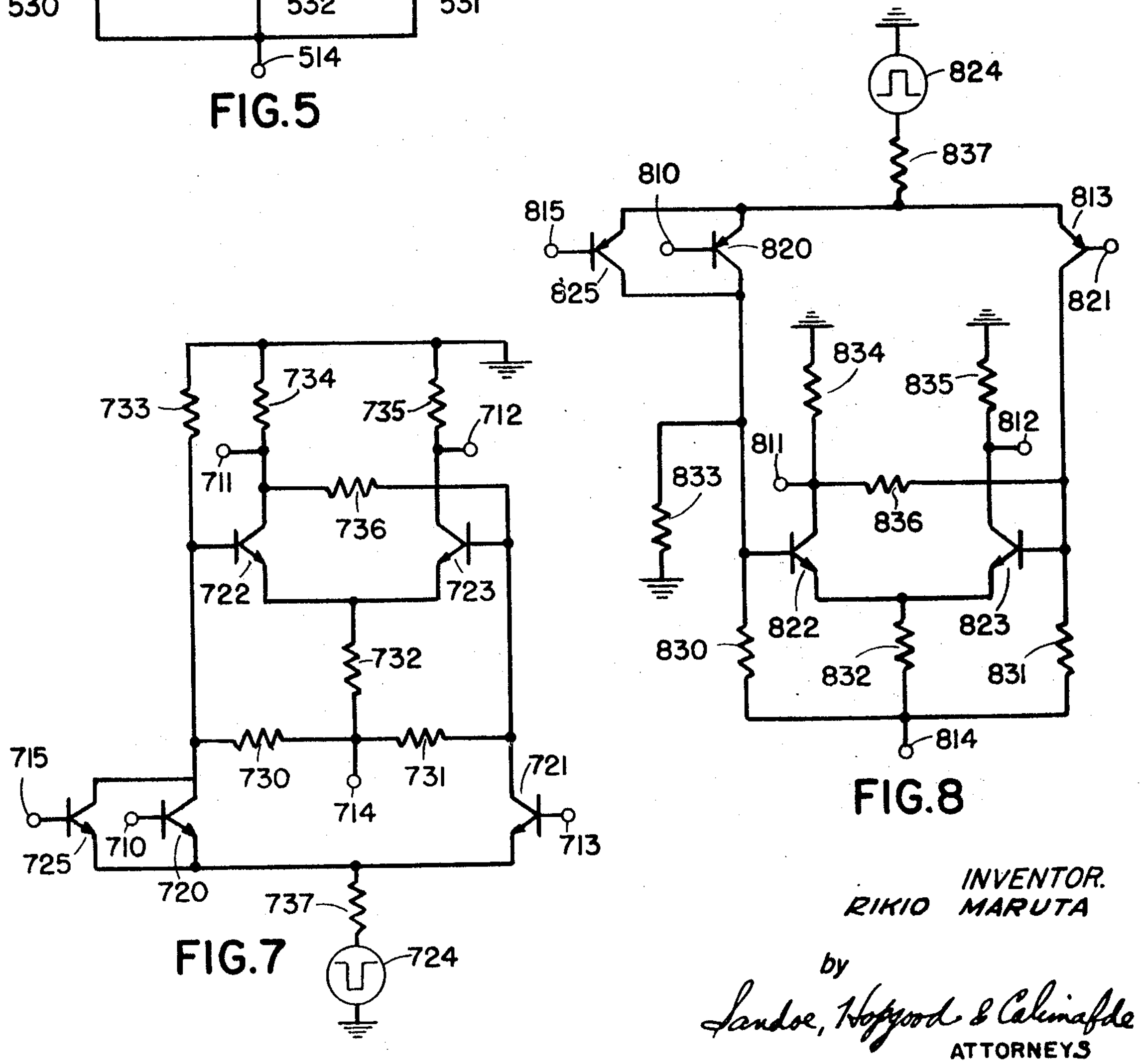
FIGS. 7 through 11 are schematic diagrams of digital circuits employing the fundamental circuit of this invention.

First, an AND/OR or NAND/NOR circuit will be briefly described. FIG. 7 shows the mechanization of the NOR function with positive logic, or the NAND function in negative logic, wherein the OR/AND output is available at a terminal 711. Exclusive of a terminal 715 and a transistor 725, everything in the circuit of FIG. 7 is identical with the fundamental circuit shown in FIG. 3. Each reference numeral in FIG. 7 is incremented by 400with respect to the corresponding reference numeral in FIG. 3. With the collector and the emitter of a transistor 720 of the fundamental circuit being connected, as shown, to the collector and the emitter, respectively, of another transistor 725, a NAND output in negative logic or a NOR output in positive logic appears at the output terminal 712 in response to the inputs independently applied to the terminal 710 connected to the base of the transistor 720 and to the terminal 715 connected to the base of the transistor 725, respectively. This output is, of course, timed with the clock pulses. In order to obtain the OR output in positive logic at the terminal 712, the circuit is so modified that the additional transistor 725 is connected to the transistor 721 instead of 720, the terminal 710 being connected to the reference voltage source.

The same principle can be applied to the fundamental circuit of FIG. 5. The circuit shown in FIG. 8 is obtained by adding a transistor 825 and a terminal 815 to the circuit identical to the fundamental circuit of FIG. 5. The circuit of FIG. 8 operates like the circuit of FIG. 7 except that the output available at the terminal 812 is the NAND output in positive logic, or the NOR output in negative logic. The principle described here is applicable to the cases or three or more inputs.

Figure 9:
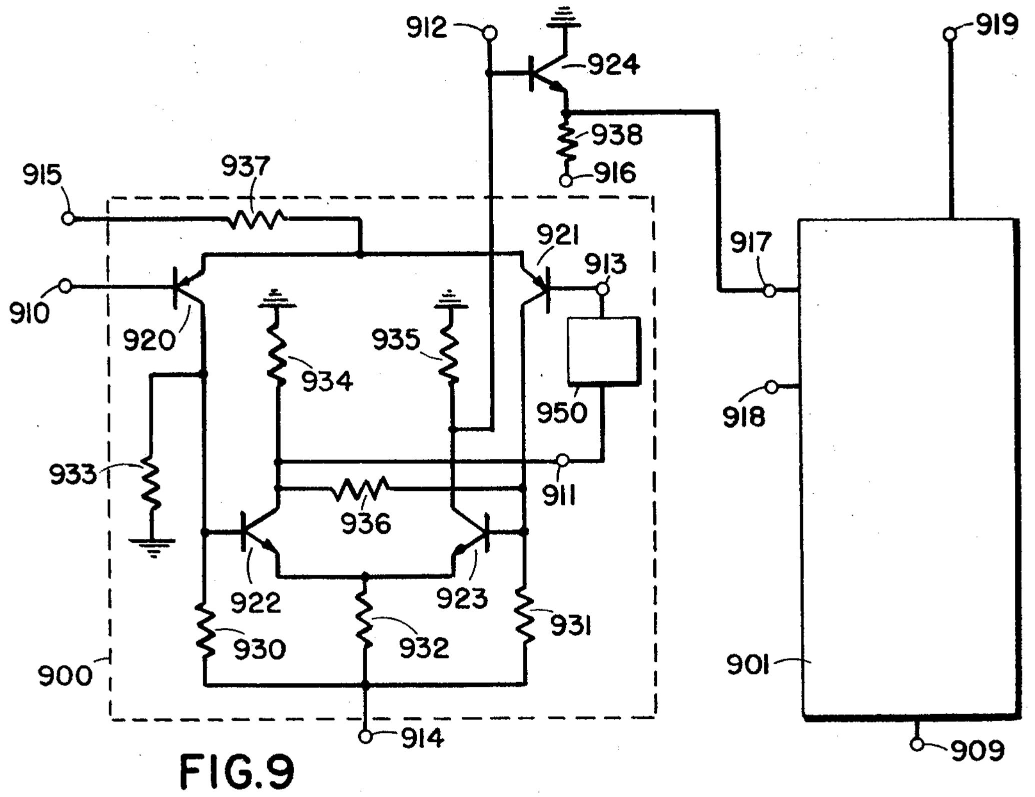
Figure 10:
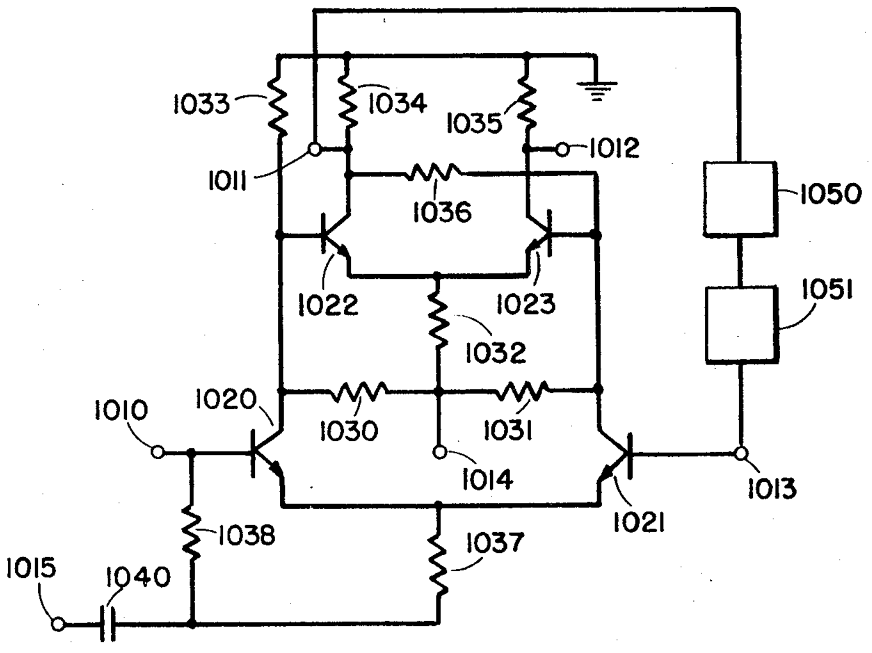

An example of a counter will be given next. FIG. 9 illustrates two binary counter stages connected in cascade. A block 900 enclosed by dotted lines is a single binary counter stage, and a block 901 represents another binary counter stage including a circuit identical to that of the clock 900, A binary counter stage circuit is attained by feeding back the inverted output, after delay, to the input terminal in the circuit of either FIG. 3 or FIG. 5. In FIG. 9, terminals 914, 916 and 909 are power supply terminals, while terminals 910 and 918 are reference voltage terminals. Input count pulses are applied to a terminal 915 and the output counted down by 2 appears at a terminal 912, while the output counter down by 4 appears at a terminal 919. More specifically, suppose that the voltage at the base of the transistor 921 is lower than the reference voltage. Upon the application of a positive pulse to the terminal 915, a current pulse flows through the transistor 921, causing a trigger voltage to be applied to the base of a transistor 923. Consequently, the state of the storage circuit is switched to make the voltage at a terminal 911 higher than the reference voltage. As the terminal 911 is connected through a delay circuit 950 to a transistor 913, upon the arrival of a succeeding input count pulse at the terminal 915, a transistor 920 is rendered conductive to switch the state of the storage circuit again. This circuit thus operates as a binary counter. It will be apparent that it can operate in response to inputs arriving at random intervals. The time delay may be readily realized by means of a coaxial cable for high-speed operation. The amount of the time delay must be at least as long as the pulse width of the input count pulse. The output pulses counted down by 2 are applied via an emitter-follower circuit comprising transistor 924 and a resistor 938 to the next stage to be counted down again by 2 through a similar operation. In the circuit shown in FIG. 9, the time delay necessary for a later stage grows correspondingly longer since the output of a counter stage is used directly as the input of the next stage. Triggering techniques employed in conventional counters may be also employed in this case. An example employing differentiated triggers is shown in FIG. 10 wherein the fundamental circuit of FIG. 3 is used, but the circuit of FIG. 5 may be used instead, of course. In FIG. 10 a level-shifter 1050 and a delay circuit 1051 together constitute a feedback path from an output terminal 1011 to an input terminal 1013, a terminal 1010 being a reference voltage terminal. The input pulses to be counted, being applied to a terminal 1015, a differentiated by a capacitor 1040 and a resistor 1038. The negative portion of the differentiated waveform causes a pulse current to flow through a resistor 1037, carrying out the counting operation.

Figure 11:
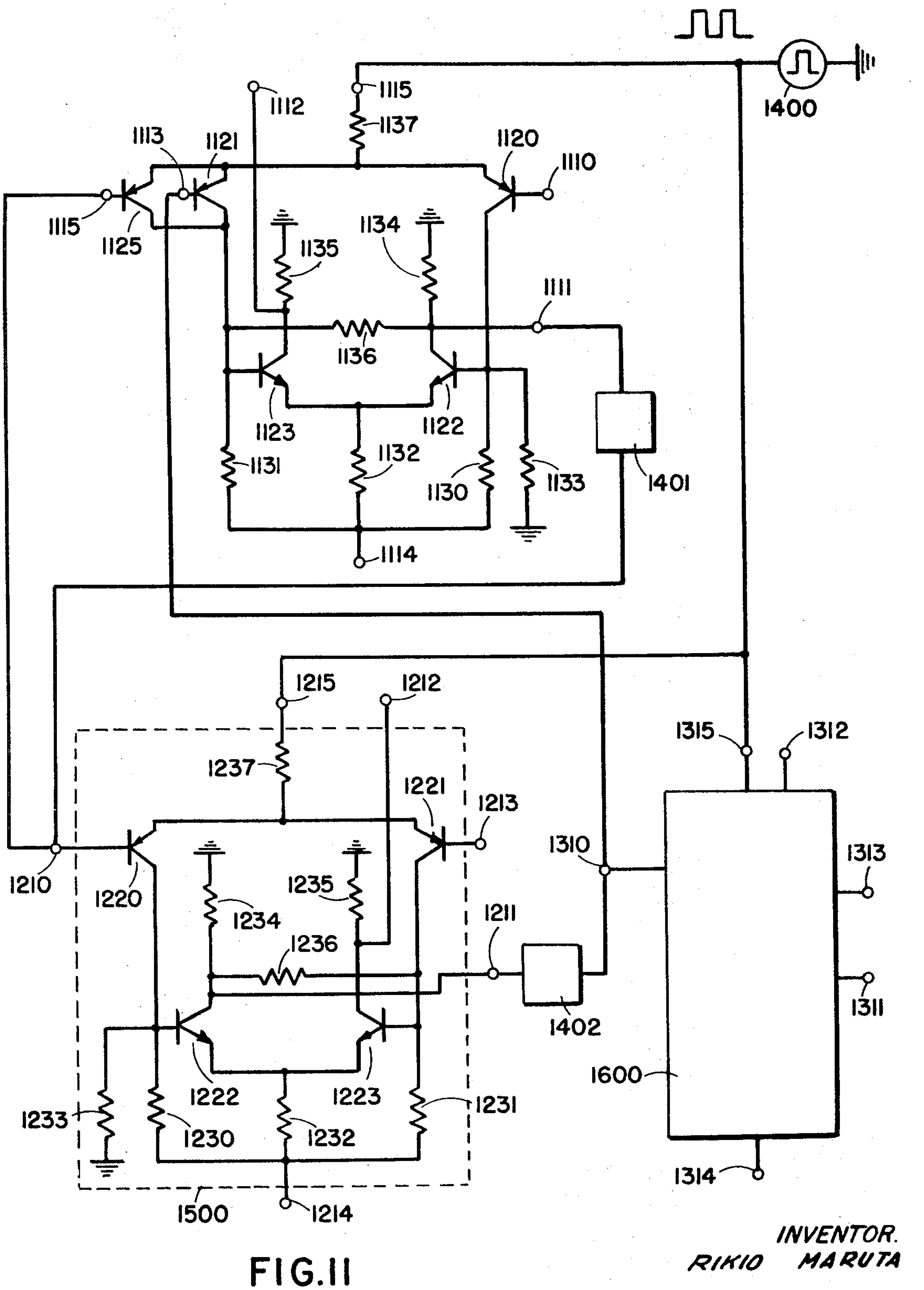

A ring counter employing the fundamental circuit of this invention will be explained next. FIG. 11 illustrates a ring counter of three stages, the principle of which can be equally applied to ring counters of any number of stages. In FIG. 11 a circuit portion 1500 enclosed with dotted lines is identical to the fundamental circuit shown in FIG. 5. Terminal 1210 is an input terminal, 1213 is a reference voltage terminal, 1214 is a power supply terminal, 1212 is an output terminal, 1211 is an output terminal for the connection to the next stage and 1215 is a clock input terminal. A block 1600 represents a unit circuit identical to that of block 1500, wherein each terminal is identified by a reference numeral made by adding 100 to the corresponding one of the block 1500. A delay circuit 1402 connects a terminal 1211 of the unit circuit 1500 to an input terminal 1310 of the unit circuit 1600, thus forming a shift register. In order to make a ring counter which requires only one pulse to circulate in it, some control circuit is needed. Such a condition is satisfied by so adapting the shift register connections that the first stage is inhibited from being "1" as long as there is a "1" in any unit circuit except the last stage, and that the first stage is switched to "1" by the first clock pulse after all the unit circuits except the last stage become "0." The unit circuit seen in the upper part of FIG. 11 performs this function. Each of the delayed outputs from the first and the second stage is connected to each of the bases of transistors 1125 and 1121, respectively. The NOR output in negative logic appears at an output terminal 1111 connected to the next stage through a delay 1401 with a reference voltage being applied to a terminal 1110. As a result, a "1" will not appear at the terminal 1111 as long as at least one of the bases of the transistors 1125 and 1121 is kept in "1." Clock pulses are supplied from a pulse source 1400 to all the unit circuits. The time delay between stages must be at least as long at the width of a clock pulse.

From the above detailed description it can be seen that various circuit functions such as pulse regenerators, AND/OR NAND/NOR, counters, shift registers, ring counters, RZ-to-NRZ converters, etc. can be realized by employing the fundamental circuit of the invention. The fundamental circuit of this invention is suitable for an integrated circuit format since it neither needs inductive nor capacitive elements. Since a mere voltage divider employing resistors is sufficient for a reference voltage source, a power supply source of only one level may be used. Even though the transistors are not operated in the saturated state, the voltage margin of the power source can be large. Since the digital circuit according to this invention has a single resistive positive feedback circuit in the current-switching circuit with the first pair of transistors, and one of the outputs is independent of the feedback loop, the output of this digital circuit is not disturbed in its operation or switching speed by the load impedance condition such as a zero impedance (a current signal output is used) or a capacitive impedance. Although the circuits in accordance with this invention are synchronous logic circuits, they can successfully operate with sinusoidal clock signals. Sinusoidal clock signals can be of great advantage in some equipment. The circuits of this invention are economical in that commonly available parts or elements may be used. This economy is accentuated when the circuit of this invention is compared with circuits wherein tunnel diodes or step-recovery diodes are employed in combination with transistors. Although particular types of transistors have been employed in the preferred embodiments of this invention, it will be apparent that similar results are obtained by replacing NPN transistors with PNP transistors and PNP transistors with NPN transistors. Similar circuits employing a plurality of transistors connected in parallel to increase the output power are to be considered within the scope of this invention.

While the principles of the invention have been described in connection with specific apparatus, it is to be clearly understood that this description is made only by way of example and not as a limitation to the scope of the invention as set forth in the objects thereof and in the accompanying claims.

I claim:

1. A digital circuit employing transistors in the unsaturated state comprising a first pair of transistors connected in differential relationship with a common emitter connection, a positive feedback circuit including a single resistor coupling the collector output of only one of said differentially coupled transistors to the base input of the other of said differentially coupled transistors, a first circuit element coupling the emitters of said differentially coupled transistors to a current source to impart a signal storage characteristic to said first pair of differentially connected transistors, a second pair of transistors connected in differential relationship with a common emitter and having their collectors respectively coupled to the bases of said first pair of transistors, second and third circuit elements coupled to said first circuit element, said current source, and the collectors of said second transistor pair, and a source of clock pulses coupled to the emitter connection of said second pair of transistors to render the transistors in the first and second pairs selectively conductive in correspondence with signals applied to the input bases of said second pair of transistors.

2. The digital circuit as recited in claim 1 and further including a logic gating function transistor connected in parallel with one of the second pair of transistors.

3. The digital circuit as recited in claim 1 and further including a delay feedback circuit coupled between the collector of said transistor to which one end of said resistive positive feedback circuit is connected and the base of the transistor in the second pair having its collector coupled to the other end of the positive feedback circuit to form a binary counter.

4. The digital circuit as recited in claim 3 and further including a level shifter circuit in series connection with the delay feedback circuit to match the required level shift at said base connected to the delay circuit.

5. In combination with the digital circuit as recited in claim 1, a second identical digital circuit having a common clock source, a first delay circuit coupling an output collector in said first pair of transistors of said first-mentioned digital circuit with an input base of said second identical circuit, a third identical digital circuit also having said common clock source, a second gate transistor coupled in parallel with one transistor in the second pair of differentially coupled transistors in said second identical digital circuit means to form a gate, a second delay circuit coupling an output collector in the first pair of differentially coupled transistors of said second identical digital circuit with an input base of said first digital circuit, the base of said second gate transistor being coupled to said input base of said first digital circuit in common connection with said second delay circuit, and the base of said one transistor coupled in parallel with said second gate transistor being coupled to said input base of said second digital circuit in common connection with said first delay circuit to form a ring counter.

UNITED STATES PATENT OFFICE
CERTIFICATE OF CORRECTION

Patent No. 3,612,913 Dated October 12, 1971

Inventor(s) Rikio Maruta

It is certified that error appears in the above-identified patent and that said Letters Patent are hereby corrected as shown below:

Column 7, line 5, after "emitter" insert -- connection --.

Signed and sealed this 29th day of August 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
☆ U.S. GOVERNMENT PRINTING OFFICE : 1969 O—366-334.